United States Patent

[11] 3,577,067

[72] Inventor Harry E. Weaver, Jr.
 Portola Valley, Calif.
[21] Appl. No. 549,353
[22] Filed May 11, 1966
[45] Patented May 4, 1971
[73] Assignee Varian Associates
 Palo Alto, Calif.

[54] PERSISTENT MODE SUPERCONDUCTIVE ORTHOGONAL GRADIENT CANCELLING COILS
 5 Claims, 9 Drawing Figs.
[52] U.S. Cl. ................................................ 324/0.5,
 317/123, 335/216
[51] Int. Cl. .................................................... G01n 27/28
[50] Field of Search ............................................ 324/0.5;
 317/123 (S), 13, 16, 40; 335/216; 336/250
 (Unofficial); 174/(S.C.) (Unofficial)

[56] References Cited
UNITED STATES PATENTS
3,287,630 11/1966 Gang ............................ 324/0.5
OTHER REFERENCES
Rev. of. Sci. Instr. - V.31, No. 4, Apr. 1960 pp. 369— 373. - (Autler)
Journal of Applied Physics - V.34, No. 11, Nov., 1963, pp. 3175— 3178. -(Marshall)

*Primary Examiner*—Rudolph V. Rolinec
*Assistant Examiner*—Michael J. Lynch
*Attorney*—Leon F. Herbert ABSTRACT: A superconductive magnet is disclosed together with superconductive gradient cancelling coils for homogenizing the magnetic field produced by the magnet. A gyromagnetic spectrometer is also disclosed which employs the magnetic field produced by the superconductive magnet. The gradient cancelling coils include a plurality of turns of a superconductor arranged adjacent the region of the magnetic field to be corrected, such magnetic field having certain residual magnetic field gradients therein to be cancelled.

Means are provided for energizing the gradient cancelling coils with electrical currents in such a configuration as to define orthogonal superconductive gradient cancelling coils. A superconductive connection is formed across the ends of the coil structure for closing the superconductive circuit across the ends of the coil to form a closed superconductive circuit, whereby the superconductive gradient cancelling coils may be operated in a persistent mode for enhanced stability and reduced power consumption. In one embodiment, a DC transformer is provided which has a primary winding coupled to the main magnetic field of the magnet and a secondary winding which serves to energize the gradient cancelling coils. In this manner, the gradient cancelling field components change their intensity in proportion to changes in intensity of the main magnetic field to maintain a corrected field.

INVENTOR
HARRY E. WEAVER JR.
BY [signature]
ATTORNEY

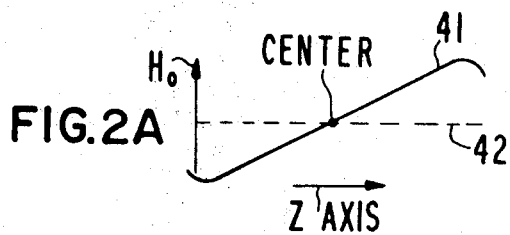
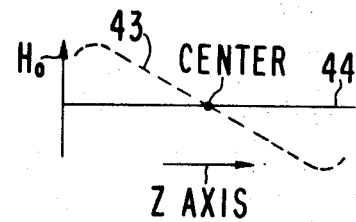
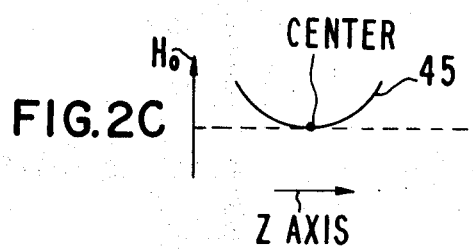
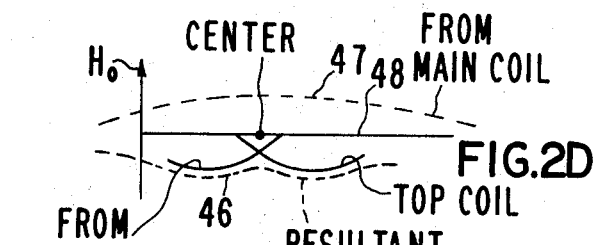
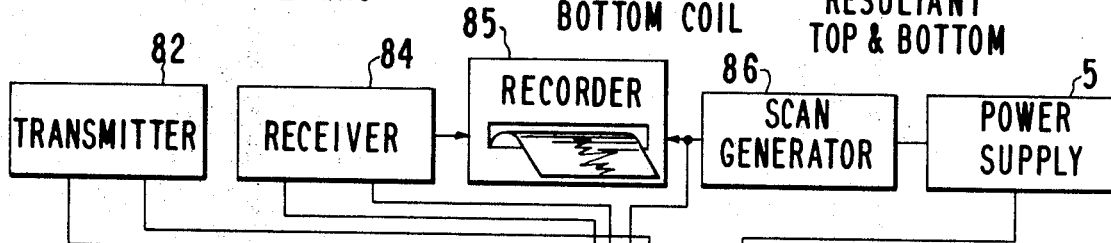
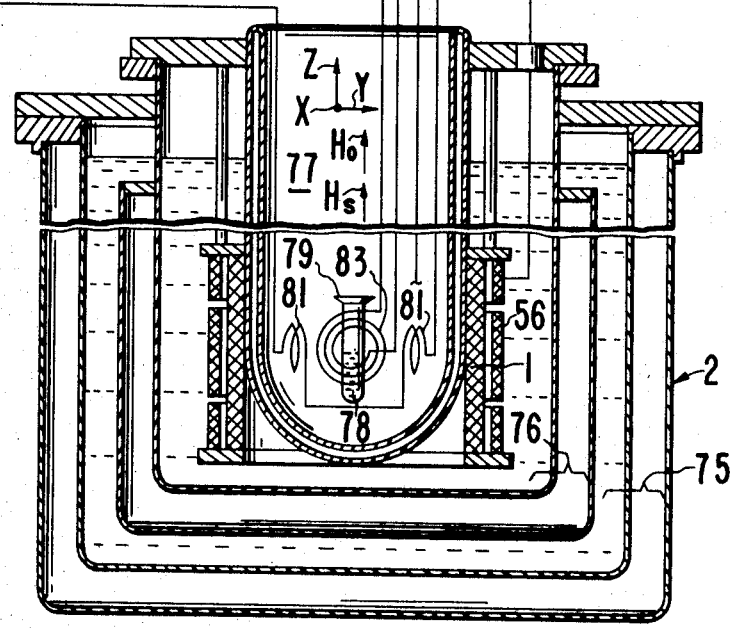
FIG. 3

PATENTED MAY 4 1971    3,577,067

INVENTOR.
HARRY E. WEAVER JR.
BY
ATTORNEY

PERSISTENT MODE SUPERCONDUCTIVE ORTHOGONAL GRADIENT CANCELLING COILS

Heretofore, superconductive gradient cancelling coils have been used with superconductive solenoids for improving the uniformity of the magnetic field. Such a system is described and claimed in copending U.S. application Ser. No. 483,402 filed Aug. 30, 1965 and assigned to the same assignee as the present invention. In this prior magnet system, certain resistive networks were connected across the terminals of the various ones of the gradient coils for determining the amplitudes of their respective energizing currents. The problem with this prior arrangement was that it included no means for operating the various field correction coil sets in the persistent mode, i.e., a completely superconductive closed circuit loop such that currents, once initiated, continue to flow undiminished for an indefinite period of time. Thus, the prior field corrective coils could not be disconnected from their power supply and power continued to be consumed by the coil sets. Furthermore, the field corrections were subject to minute fluctuations introduced by imperfect filtering and transient surges of the power supply.

In another prior superconductive solenoid, the solenoid winding was segmented into a central section with a pair of end segments. Those winding segments included superconductive bypass wires connected across their terminals such that the individual winding segments could be put into closed superconductive loops for cancelling residual gradient components of the main solenoid. Such a system is described in an article entitled "Application of the Garrett Method to Calculation of Coil Geometries for Generating Homogeneous Magnetic Fields in Superconducting Solenoids" appearing in Journal of Applied Physics, vol. 34, No. 11 of Nov. 1963. However, in this prior system the winding segments were not energized in an orthogonal manner with respect to each other such that a change of the current in one winding segment which was made to cancel a certain residual gradient produced a change in the total magnetic field intensity at the center of the solenoid and also produced a magnetic field gradient which interfered with a previously optimized setting of another gradient cancelling winding segment.

In the present invention the coil sets are orthogonal with respect to each other and to the main field of the solenoid at its center. Means are provided for energizing the orthogonal field corrective coil sets and for operating the coil sets in the persistent mode, whereby in their operating persistent mode they draw no power from an external power supply, and whereby the stability of their correction is enhanced. In another embodiment of the present invention, the persistent mode orthogonal field correction coils are coupled to the magnet producing the field which is being corrected in such a manner that the persistent mode currents in the field corrective coils vary in amplitude with changes in the intensity of the field being corrected. In this manner the main magnetic field may be scanned in intensity and the field corrective coils will change their field corrective components to maintain the proper correction, as previously established.

As used herein "orthogonal coil" means that the coil as energized produces a gradient cancelling field corrective component which does not substantially change the total magnetic field intensity over the region of the main field that is being corrected nor does it produce a substantial gradient component that will interfere with the previously optimized settings of other gradient cancelling coils arranged for correcting the field. Orthogonal gradient cancelling coil configurations may be obtained by shaping the current paths of the various separately energizable coils in certain predetermined patterns as taught in copending U.S. application Ser. No. 348,442 filed Mar. 2, 1964 now U.S. Pat. No. 3,287,630 and as taught in Ser. No. 441,829 now U.S. Pat. N0. 3,469,180 filed Mar. 22, 1965 or by adopting certain coil patterns and superimposing different combinations of current through the various coils as taught in copending U.S. application Ser. No. 442,000 now U.S. Pat. No. 3,488,561 filed Mar. 23, 1965 all assigned to the same assignee as the present invention.

The principal object of the present invention is the provision of a persistent mode superconductive orthogonal magnetic field gradient cancelling coil.

One feature of the present invention is the provision of an orthogonal superconductive gradient cancelling coil having means for forming a closed superconductive circuit loop, whereby the gradient cancelling coil may be operated in the persistent mode to enhance the stability of its field corrective component and whereby its operating power consumption is negligible.

Another feature of the present invention is the same as the preceding feature wherein the superconductive circuit loop is closed through a switch means, whereby the coil may be energized to a certain current amplitude from an external power supply and then switched into the persistent mode to sustain the predetermined field correction.

Another feature of the present invention is the same as the first feature wherein the superconductive gradient cancelling coil is coupled to the magnet producing the field to be corrected either by means of a DC field transformer or by being closely spaced to the field region being corrected, such that the current in the gradient cancelling coil automatically changes its magnitude in accordance with changes in the intensity of the main field of the magnet to maintain the previously established field correction.

Another feature of the present invention is the same as any one or more of the preceding features wherein the superconductive gradient cancelling coils are formed by segments of the windings of the superconductive solenoid which produces the main field of the magnet.

Other features and advantages of the present invention will become apparent upon a perusal of the following specification taken in connection with the accompanying drawings wherein:

FIG. 1 is a schematic circuit diagram, partly in block diagram form of a superconductive magnet system employing features of the present invention;

FIGS. 2*1—d* are plots of magnetic field intensity $H_o$ versus distance, $d$, along the Z-axis of the magnet of FIG. 1 and depicting the effect of the Z-axis gradient cancelling coils of FIG. 1;

FIG. 3 is a schematic longitudinal sectional view, partly in block diagram form, of a gyromagnetic resonance spectrometer employing the magnet system of FIG. 1;

Figure 1:
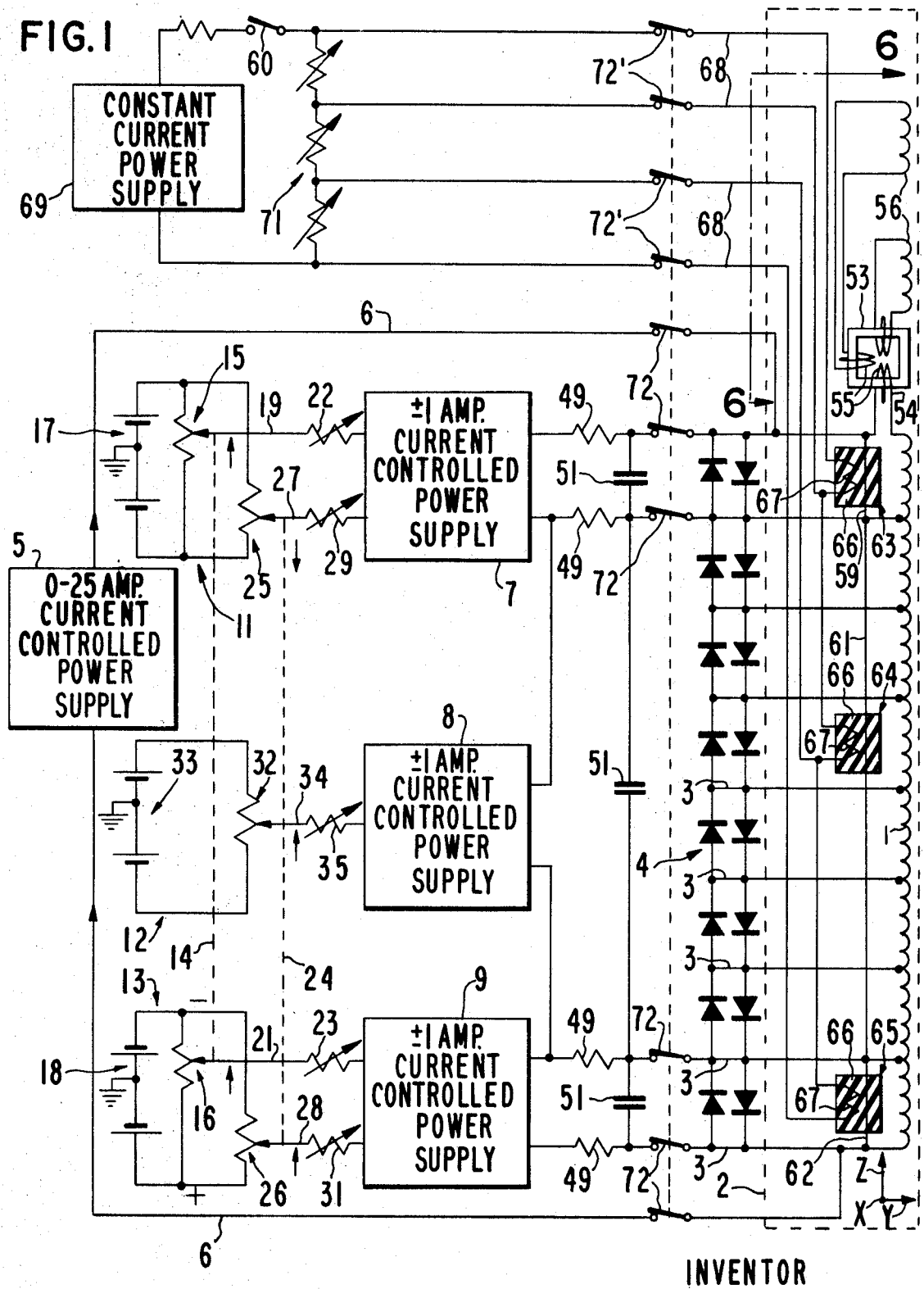

Referring now to FIG. 1 there is shown in schematic form a circuit diagram of a superconductive magnet system employing features of the present invention. A superconductive winding, which may comprise, for example, 120,000 feet of copper jacketed NbZr wire is wound into a solenoid 1, 12 inches long and 1.5 inches in inside diameter. The solenoid 1 is preferably of the type having additional series-connected windings at the ends to bring up the intensity of the field near the ends. The solenoid is tapped at a number of places along the length of the solenoid winding such as, for example, at 12,000 foot intervals of the winding. These taps are brought out of a cryostat 2, in which the solenoid 1 is immersed, via copper leads 3 to a bank of forward and backward conducting diodes 4 with one backward and one forward conducting diode connected across each tapped segment of the solenoid winding 1. The provision of these diodes 4 protects the solenoid 1 and power supply in case the solenoid quenches, and forms the subject matter of and is claimed in copending U.S. application Ser. No. 543,666 now U.S. Pat. No. 3,474,294 filed Apr. 19, 1966, and assigned to the same assignee as the present invention.

A main power supply 5, which is of the current controlled or regulated type, supplies the energizing current of 0 to 25 amps to the solenoid 1 via leads 6. Three additional power supplies 7, 8, and 9, which are of the current controlled type, deliver ± 1 amp of current at 3 volts to their respective loads. The end power supplies 7 and 9 are each connected across the end winding segments of the solenoid 1. Each end winding segment comprises for example 10 percent of the total number of windings of the solenoid 1. The center power supply 8 is connected across the central section of winding segments which comprises about 80 percent of the total number of windings of the solenoid 1. The power supplies 7, 8, and 9 have a near infinite output impedance and each comprises an operational amplifier followed by a high fidelity audio power amplifier output stage with its capacitors removed to provide DC response. The output current of the power supplies 7, 8 and 9, is supplied to the two end and central windings sections, is controlled by the input signals applied to the power supplies 7, 8, and 9 from their respective potentiometer networks 11, 12 and 13.

The two end power supply inputs are ganged together via a shaft 14 driving the pickoff arms of a pair of potentiometers 15 and 16 which are connected across the terminals of grounded centertapped battery supplies 17 and 18. Turning the shaft 14 causes the respective pickoffs of the potentiometers 15 and 16 to provide equal and opposite input signals to the power supplies 7 and 9 via leads 19 and 21, respectively. In this manner, plus current is supplied to one end segment of the solenoid and an equal minus current is supplied to the other end segment of the solenoid. These plus and minus currents are superimposed upon the main solenoid current supplied from the main power supply 5 to produce a linear orthogonal gradient component superimposed upon a certain residual linear gradient component of the main magnetic field of the solenoid 1 for cancelling a certain residual gradient in a manner more fully described below. Variable resistors 22 and 23 are placed in the leads 19 and 21 for providing a fine adjustment in the relative amplitudes of the output currents of the end power supplies 7 and 9.

Similarly, a second common shaft 24 interconnects, and thus gangs, the potentiometer networks 11, 12 and 13 of the power supplies 7, 8, and 9 to provide another orthogonal gradient control. In this instance the end segment power supply input potentiometers 25 and 26 are connected across their respective grounded centertapped batteries 17 and 18 such that turning the shaft 24 causes their respective pickoffs to pick off input signals of like sign, i.e., both plus or minus, such that both end power supplies produce a like plus or minus output current. These second input signals are supplied to end power supplies 7 and 9 via leads 27 and 28 with each lead including a variable resistor 29 and 31 for providing a fine relative adjustment in the amplitudes of the input signals. However, the center power supply 8 is also ganged to the shaft 24 and its input potentiometer 32 is connected across its grounded centertapped battery 33 in such a manner that its picked off input signal is of an opposite sign to that picked off by the end potentiometers 25 and 26. The center power supply input signal, picked off by potentiometer 32, is supplied to the center power supply 8 via lead 34 and variable resistor 35. Resistor 35 permits adjusting the amplitude of the input signal to the center power supply relative to that supplied to the end power supplies 7 and 9.

The output current components produced by rotation of shaft 24 are superimposed upon the previously established currents in the solenoid 1 produced by the main power supply 5 and end power supplies 7 and 9. Thus, rotation of shaft 24 causes the end winding segment current components to each vary alike in a like sense while the current component supplied to the center winding section varies in the opposite sense. The result is the production of an adjustable nonlinear orthogonal axial gradient component which is superimposed upon the residual axis nonlinear gradient component of the main magnetic field, if any, for cancelling same to render the total magnetic field of the solenoid 1 more uniform.

The operation of the gradient cancelling controls 14 and 24 is more easily seen with regard to FIGS. 2*l—d*. Assume that the main magnetic field $H_o$, produced by the current from the main power supply 5 passing through the solenoid 1, is as shown by the solid line 41 of FIG. 2*a*. This field $H_o$ has a linear gradient along the axis of the solenoid 1, the Z-axis. The desired field would be as shown by the dotted line 42 of FIG. 2*a*, i.e., a uniform field of constant intensity from one end of the solenoid 1 to the other. This linear gradient is cancelled in the circuit of FIG. 1 by turning shaft 14 to produce an increase in the field $H_o$ at the low intensity end and reduce the field $H_o$ at the high intensity end, as shown by the dotted line 43 of FIG. 2*b*. The resultant field is uniform as shown by the solid line 44 of FIG. 2*b*. Notice that this correction is made without changing the total magnetic field intensity at the center of the solenoid. This is very important because the field uniformity is typically monitored by, or used for, gyromagnetic resonance. If the total field intensity $H_o$ changed over the resonance sample, located at the center of the solenoid, the resonance signal would be lost, assuming the sample were excited from a conventional fixed frequency source tuned to the Larmor frequency in the field before the gradient correction were made. Alternatively, assume the initial total magnetic field $H_o$ had a nonlinear gradient as shown by the solid line 45 in FIG. 2*c*. Turning the shaft 24 in the proper direction would introduce a corrective gradient component as shown by the dotted lines 46 and 47 of FIG. 2*d*. In this case, the end power supplies 7 and 9 superimpose corrective field components 46 which, if not otherwise compensated, would produce a change in the total field intensity $H_o$ at the center of the solenoid. However, this change is avoided because the center power supply 8 produces an opposite sense current and field 47 which cancels, in the center region of the solenoid, the undesired field change produced by the end winding segments to produce a uniform total field 48. In actual practice, the undesired residual main magnetic field gradients of the type depicted by lines 41 and 45 of FIGS. 2*a* and 2*c* are typically mixed. However, the controls 14 and 24 are independently adjustable or orthogonal, i.e., an optimum setting of one control 14 does not interfere with a previously optimized adjustment of the other control 24, for removing these undesired axial gradients, and the corrections are made without changing the total magnetic field intensity at the center of the solenoid 1.

Low pass filter networks comprising $0.5\Omega$ series connected resistors 49 and shunting capacitors 51, as of $2.2\mu f$, are connected across the output terminals of each of the power supplies 7, 8, and 9 to prevent oscillation of the output current of the power supplies 7, 8, and 9. Likewise, the main power supply 5 includes a low pass filter, not shown, connected across its output terminals for the same reason.

Figure 4:
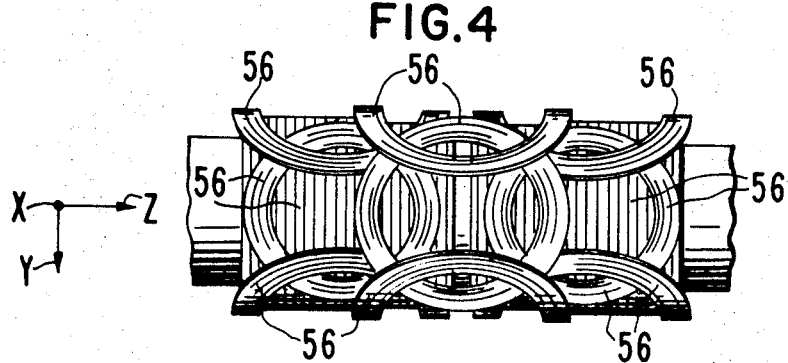
FIG. 4 is an enlarged side elevational view of a set of orthogonal gradient cancelling coils of FIG. 3 as delineated by line 4—4.
Figure 6:
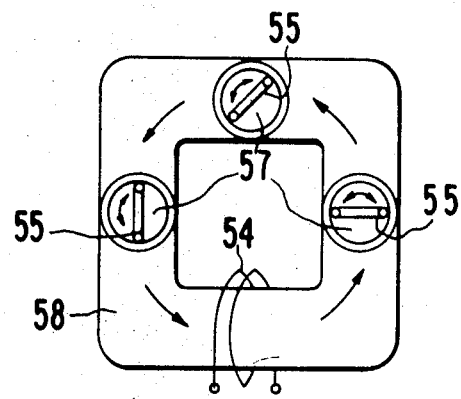
FIG. 6 is a schematic plan view of the DC current transformer portion of FIG. 1 as delineated by line 6—6.

Although the end and center sections of the solenoid 1 are employed in connection with the separate power supplies 7, 8, and 9 for cancelling certain residual axial gradients, still other axial and transverse residual gradients exist which it is desirable to eliminate. Accordingly, several other orthogonal gradient cancelling coils, which preferably have certain prescribed orthogonal physical geometries to permit optimum independent adjustment of each without mutual interference, are arranged adjacent the central region of the solenoid for improving the uniformity of the field $H_o$. Such a set of coils may have geometries as indicated in FIG. 4 and may be disposed surrounding the central region of the main field $H_o$ as shown in FIG. 3. Such a set of orthogonal coil geometries forms the subject matter of and is claimed in copending U.S. application Ser No. 348,442 filed Mar. 2, 1964 now U.S. Pat. No. 3,287,630 and assigned to the same assignee as the present invention. These additional orthogonal gradient cancelling coils each comprise plural turns of superconductive wire and, in one embodiment of the present invention, they are energized by being coupled to the main field $H_o$ of the magnet 1 via an adjustable DC transformer 53, more fully described with regard to FIG. 6. Alternatively they may be located inside the main solenoid 1 closely surrounding the region of field to be corrected in which case they require no DC transformer and ends of each coil are merely connected together by a superconductive joint.

The transformer 53 is energized via a superconductive primary winding 54 which is series connected to the superconductive main solenoid winding 1. Superconductive secondary windings 55, only two of which are shown for simplicity of explanation, are each connected across the respective terminals of individual ones of the other transverse and axial gradient cancelling coils 56 to form closed superconductive circuit loops immersed in the cryostat 2. The current through each of the gradient cancelling coils 56 is individually adjustable, and thus its field corrective gradient component is adjustable (See FIG. 6), by turning its respective armature 57 on which the secondary winding 55 is wound. Turning the armature 57 increases or decreases the magnetic flux of the primary winding 54, as produced in the iron core 58 of the transformer 53, which threads through the respective secondary winding 55. The various armatures 57 are turned via mechanical shafts, not shown, for the optimum adjustment of the various field corrective components.

The DC transformer energized gradient cancelling coils 56 yield an operating advantage, as compared to the end and center section winding gradient cancelling coils of the solenoid, because they are coupled to the main field of the solenoid 1. Thus, as the main field is scanned, by changing the current supplied by the main power supply 5, the respective currents in the gradient cancelling coils and thus their corrective field components are scanned proportionally, thereby preserving their proper preestablished field correction. In contrast, the other gradient coils, which form a part of the solenoid windings, require the end and center power supplies 7 and 9 to be readjusted to maintain their proper corrections when the main field intensity is changed to a new value. Also the gradient cancelling coils 56 have an additional advantage in that they require no separate power supply.

For the case where each orthogonal coil sets 56 has its ends joined together via superconductive joint and are merely placed inside the solenoid winding 1 surrounding the central region of the main solenoid which is to be corrected, the currents in each of the coil sets will automatically adjust themselves to cancel out minute residual gradients in the main field being corrected. These corrections will be self-adjusting with scan of the main field intensity to automatically preserve a uniform field inside the coil sets 56. In other words the coil sets 56 act as secondary DC transformer windings coupled to the primary field being corrected. Each coil set 56 orthogonally couples to its respective main field gradient component, if any, which is being corrected.

Once the main magnetic field has been corrected via the various orthogonal gradient cancelling coils the magnet system may be switched into a persistent current mode, thereby preserving indefinitely the total corrected field $H_r^-$. Superconductive wires 59, 61, and 62 are connected across the ends of the two end sections and the center section of the main solenoid windings. Persistent switches 63, 64, and 65 are connected in the superconductive wires 59, 61, and 62. The persistent switches each comprise a thermally insulative dielectric member 66 through which the superconductive wire 59, 61 and 62 passes. A resistive heating element 67 is also embedded in the dielectric member 66. Heating current is supplied to each of the heating elements 67 via leads 68 supplied with current from a power supply 69 as divided by and tapped off of a voltage divider network 71. An array of ganged single pole double throw switches 72 are connected in the leads 6 and 3 interconnecting the respective power supplied 5, 7, 8, and 9 and the solenoid 1 and in the leads 68 interconnecting the heating elements 67 of the persistent switches 63, 64, and 65. A switch 60 is also connected in circuit between the persistent switch power supply 69 and the voltage divider 71.

During the time the superconductive solenoid 1 is being energized from the power supplies 5, 7, 8 and 9, the switches 60, 72 and 72' are all closed. The heating elements 67 are thus energized thereby heating the superconductive wires 59, 61 and 62 to a temperature slightly above their superconductive critical temperature such that they do not appear superconductive and thus do not bypass the current in the main superconductive solenoid winding 1. Once the corrected field condition has been achieved in the main field of the solenoid magnet, as described above, the switch 60 is opened. The persistent switches 63, 64 and 65 are thus deenergized allowing the liquid helium within the cryostat 2 to cool quickly, i.e., within 1 to 2 seconds, the superconducting bypass wires 59, 61 and 62 to their superconductive 5, 7, 8 and 9 is then reduced to zero amplitude and as this is accomplished the magnet current shifts from the circuit portions which included the various magnet power supplies 5, 7, 8, and 9 to the superconductive bypass circuit loop portions. In this manner, the previously established currents in the various sections of the solenoid windings 1 persist indefinitely, thereby preserving the preestablished corrected field conditions without the need of supplying additional power to the magnet system. The switches 72 and 72' are then opened to isolate the magnet from the power supplies. In the persistent mode, the field has enhanced stability since it is now isolated from possible current fluctuations and surges produced by the power supplies.

Referring now to FIG. 3 there is shown a gyromagnetic resonance spectrometer employing the magnet system of FIG. 1. The superconductive solenoid 1 is immersed in the cryostat 2. The second gradient cancelling coil system 56 is coaxially disposed of and outside of the main solenoid 1. The cryostat 2 includes a liquid nitrogen dewar assembly 75 surrounding a liquid helium dewar assembly 76 having the superconductive solenoid 1 immersed therein. A third dewar 77 is centrally disposed of the liquid helium and nitrogen dewars and is open to the atmosphere. The third dewar 77 contains a gyromagnetic resonance sample 78 to be analyzed. The sample 78 is contained within a glass vial 79.

The solenoid 1 produces an intense uniform unidirectional magnetic field $H_o$, as of 54 kg., directed along the Z-axis and through the sample volume. A transmitter coil 81, which is coaxially aligned with the X-axis, is excited with radio frequency power supplied from a transmitter 82. The transmitter output is at the Larmor frequency as of 220 mHz., of the gyromagnetic bodies (protons) within the sample 78 to excite gyromagnetic resonance thereof. A receiver coil 83, aligned with the X-axis, picks up the resonance signal emanating from the sample 78 and feeds the resonance signal to a receiver 84 wherein it is amplified, detected, and fed to a recorder 85.

The magnetic field $H_o$ is scanned in intensity by superimposing a uniform DC field component $H_s$ along the Z-axis on the main field of the solenoid 1. The scan field component is produced by a small solenoid, not shown, wound around the probe inside the main solenoid. The scan solenoid is supplied with current from a scan generator 86. The field $H_o$ is scanned through the various resonance lines of the sample 78 to produce a resonance output spectrum signal. The spectrum signal is recorded in recorder 85 as a function of the scan field signal to produce the recorded resonance spectrum of the sample 78.

Figure 5:
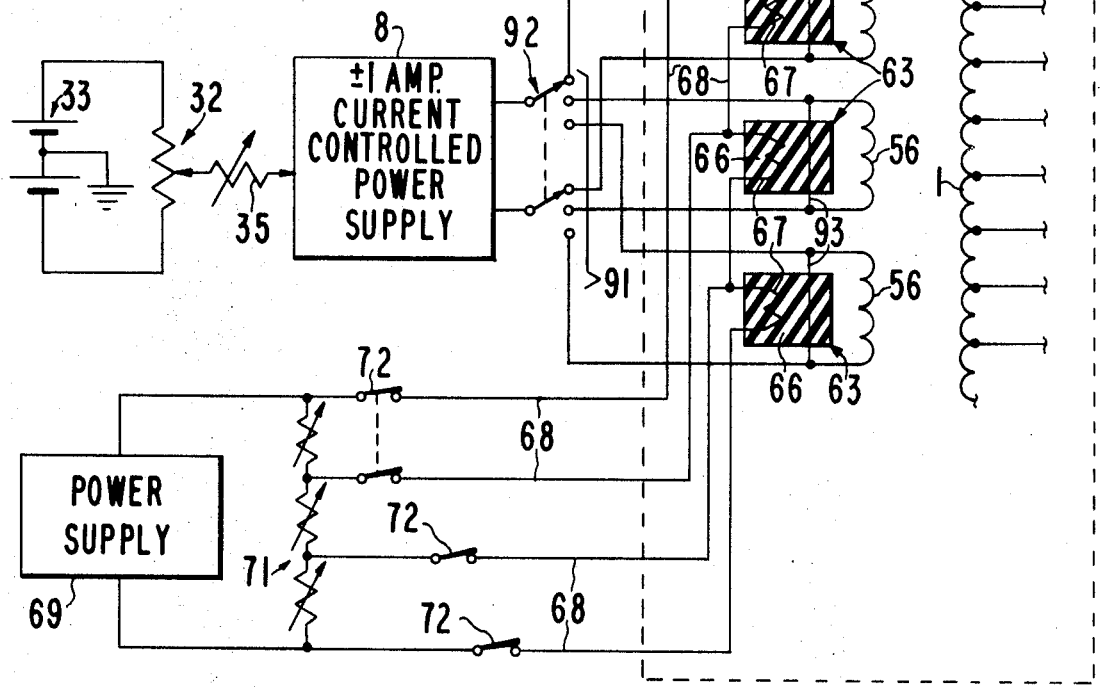
FIG. 5 is a schematic circuit diagram for energizing the gradient cancelling coils of FIG. 4.

Referring now to FIG. 5 there is shown an alternative gradient cancelling coil circuit embodiment of the present invention. In this embodiment the second group of superconductive gradient cancelling coils 56 are sequentially energized from one power supply and then sequentially switched into the persistent mode. More particularly, the superconductive gradient cancelling coils 56, as described above, are each connected to a set of switch terminals 91 of a double pole multiple position switch 92 for sequentially connecting the various gradient cancelling coils 56 to the power supply 8. The power supply 8 is the same as the one previously described with regard to FIG. 1. Superconductive wires 93 are connected across the terminals of each of the superconductive gradient cancelling coils 56. Persistent switches 63, as previously described, are connected in the superconductive bypass wire portion 93 of the circuit. In operation, each one of the gradient coils 56 is sequentially connected to the power supply 8 via switch 92. The switches 60 and 72' controlling the current to the persistent switch heating elements 67, are closed.

The selected coil 56 is then energized via the power supply 8 to the proper current to correct a certain one of the residual gradients of the main field produced by the solenoid 1. When the proper field correction is obtained, the particular persistent switch 63 is deenergized by opening its heater current switch 72. After the bypass wire 93 has cooled to its superconductive state the current from the power supply 8 is reduced to zero and then disconnected via switch 92. In this manner, the established field correction, for that gradient cancelling coil, is preserved indefinitely without need of supplying additional power to that gradient cancelling coil 56. This procedure is repeated for the other coils 56 until all coils 56 are properly energized and operating in the persistent mode.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A superconductive magnet system including, means forming a superconductive solenoid having a winding with a multitude of turns of superconductor for producing a main magnetic field region within said solenoid having certain residual magnetic field gradient components, said winding of said solenoid including a pair of end winding segments connected in series with an intermediate winding segment of more turns than each of said end winding segments, each of said winding segments comprising a multitude of turns of superconductor, means forming a superconductor shunt connected in shunt across each of said winding segments, means including nonsuperconductive current carrying leads connected to each end of each of said end winding segments for energizing said end winding segments from a current supply with current having an amplitude which is separately variable relative to the amplitude of the current in said intermediate winding segment of said solenoid to produce a gradient cancelling field component, means forming a switch connected in each of said superconductor shunts which shunt said end winding segments, whereby each of said end winding segments may be energized from the current supply to produce a certain gradient cancelling field component superimposed on the main field of said solenoid and then switched via said switch means into a persistent superconductive current mode to preserve the preestablished gradient cancelling field component.

2. The apparatus of claim 1 including, means forming a cryostat for containing said solenoid means and for cooling said solenoid to a superconductive state, means for immersing a gyromagnetic resonance sample of matter within the gradient cancelled region of magnetic field, means for exciting and detecting gyromagnetic resonance of the sample.

3. In a superconductive magnet apparatus, means forming a superconductive solenoid for producing a main magnetic field region to be corrected which has certain residual magnetic field gradient components therein, first and second gradient cancelling coil means for cancelling the residual magnetic field gradient components, each of said first and second gradient cancelling coil means having an orthogonal current path geometry relative to each other, a superconductive joint connected across the ends of each of said first and second coil means to form first and second closed superconductive circuits, and wherein said closed superconductive circuits are disposed inside said solenoid surrounding the field region to be corrected, whereby each of said coil means acts as the secondary winding of a DC transformer and the correct current amplitude will automatically flow through each of said orthogonal coil geometries to cancel the certain residual magnetic field components in the region to be corrected.

4. In a superconductive magnet apparatus, means forming a superconductive solenoid for producing a main magnetic field region to be corrected which has certain residual magnetic field gradient components therein, first and second gradient cancelling coil means for cancelling the residual magnetic field gradient components, each of said first and second coil means having an orthogonal current path geometry relative to each other, means forming a superconductive connection connecting across the ends of each of said first and second coil means to form first and second closed superconductive circuits, means forming a direct current transformer having a primary winding energized with current proportional to the current flowing in the windings of said superconductive solenoid, and said superconductive connection which connects across the ends of each of said first and second coils being wound to form first and second secondary windings of said direct current transformer means, whereby the gradient cancelling field components produced by said first and second gradient cancelling coil means have magnitudes which vary in proportion to the current flowing in said solenoid, thereby preserving the preestablished gradient cancelling effect when the main magnetic field intensity is scanned.

5. The apparatus of claim 4 including means for varying the amount of magnetic coupling between the primary and secondary windings of said transformer means for adjusting the amplitude of the gradient cancelling field component produced by said gradient cancelling coil means.